US012396490B2

(12) United States Patent
Antonopoulos et al.

(10) Patent No.: US 12,396,490 B2
(45) Date of Patent: Aug. 26, 2025

(54) MAGNETIC CONNECTOR

(71) Applicant: Philip Morris Products S.A., Neuchatel (CH)

(72) Inventors: Roland Antonopoulos, Neuchatel (CH); Jean-Luc Fringeli, Singapore (SG); Hao Yin, Lisle, IL (US); Xueqing Zhang, Lisle, IL (US)

(73) Assignee: Philip Morris Products S.A., Neuchatel (CH)

( * ) Notice: Subject to any disclaimer, the term of this patent is extended or adjusted under 35 U.S.C. 154(b) by 820 days.

(21) Appl. No.: 17/256,808

(22) PCT Filed: Jul. 19, 2018

(86) PCT No.: PCT/CN2018/096246
§ 371 (c)(1),
(2) Date: Dec. 29, 2020

(87) PCT Pub. No.: WO2020/014917
PCT Pub. Date: Jan. 23, 2020

(65) Prior Publication Data
US 2021/0251302 A1 Aug. 19, 2021

(51) Int. Cl.
*A24F 40/40* (2020.01)
*A24F 40/95* (2020.01)
*H01R 13/62* (2006.01)

(52) U.S. Cl.
CPC ............ *A24F 40/95* (2020.01); *A24F 40/40* (2020.01); *H01R 13/6205* (2013.01)

(58) Field of Classification Search
None
See application file for complete search history.

(56) References Cited

U.S. PATENT DOCUMENTS 9,118,990 B2 * 8/2015 Hankey .................. H01R 29/00
9,689,527 B2 * 6/2017 Franklin ................. F16M 11/14
(Continued)

FOREIGN PATENT DOCUMENTS

CN 103066442 A 4/2013
CN 202999299 U 6/2013
(Continued)

OTHER PUBLICATIONS

Combine Russian Federation Office Action and Search Report issued Nov. 11, 2021 in Russian Federation Patent Application No. 2020142053/07(078135) (with English translation), 23 pages.
(Continued)

*Primary Examiner* — Felix O Figueroa
(74) *Attorney, Agent, or Firm* — Oblon, McClelland, Maier & Neustadt, L.L.P.

(57) ABSTRACT

An aerosol-generating system is provided, including: an aerosol-generating device to receive an aerosol-forming substrate and generate an aerosol from the substrate, the device including a rechargeable power source; a charger electrically connectable to the device to supply power to the device to recharge the power source; and an electrical connector including: a first connector part including electrical contacts and a first magnetic element, and a second connector part, releasably electrically connectable to the first part and including electrical contacts, at least one of which is a resilient contact actuable between an extended position and a depressed position and is biased to return to the extended position, and a second magnetic element, the device including one of the first and second connector parts and the charger including the other one of the first and second connector parts, and the first and second connector parts are positionable in a first connection position.

16 Claims, 8 Drawing Sheets

(56) References Cited

U.S. PATENT DOCUMENTS

| | | | |
|---|---|---|---|
| 9,806,458 B1* | 10/2017 | Chiu | H01R 13/40 |
| 9,935,400 B1* | 4/2018 | Ejiri | H01R 13/6205 |
| 10,004,264 B2 | 6/2018 | Rado | |
| 10,039,321 B2 | 8/2018 | Verleur et al. | |
| 10,085,481 B2 | 10/2018 | Verleur et al. | |
| 10,561,173 B2* | 2/2020 | Liu | H02J 7/0044 |
| 2008/0164934 A1 | 7/2008 | Hankey et al. | |
| 2011/0248806 A1 | 10/2011 | Michael | |
| 2012/0174368 A1 | 7/2012 | Michael | |
| 2014/0261495 A1 | 9/2014 | Novak, III et al. | |
| 2015/0128972 A1 | 5/2015 | Verleur et al. | |
| 2015/0128976 A1 | 5/2015 | Verleur et al. | |
| 2016/0278436 A1* | 9/2016 | Verleur | A24F 40/90 |
| 2017/0027221 A1 | 2/2017 | Liu | |
| 2017/0112196 A1 | 4/2017 | Sur et al. | |
| 2018/0090885 A1 | 3/2018 | Ejiri et al. | |
| 2018/0102605 A1 | 4/2018 | Patton et al. | |
| 2018/0102606 A1 | 4/2018 | Tham et al. | |
| 2018/0116288 A1 | 5/2018 | Hu et al. | |
| 2018/0295889 A1 | 10/2018 | Rado | |
| 2018/0368481 A1 | 12/2018 | Verleur et al. | |
| 2019/0260158 A1 | 8/2019 | Tham et al. | |
| 2019/0387803 A1* | 12/2019 | Yamada | A24F 40/95 |
| 2020/0287324 A1 | 9/2020 | Tham et al. | |
| 2020/0350728 A1 | 11/2020 | Patton et al. | |
| 2021/0194178 A1 | 6/2021 | Tham et al. | |
| 2021/0344140 A1 | 11/2021 | Patton et al. | |
| 2022/0015456 A1* | 1/2022 | Liu | A61M 15/0001 |

FOREIGN PATENT DOCUMENTS

| | | |
|---|---|---|
| CN | 104621716 A | 5/2015 |
| CN | 103859607 B | 3/2016 |
| CN | 207306085 U | 5/2018 |
| CN | 207339338 U | 5/2018 |
| EP | 3 287 023 A1 | 2/2018 |
| JP | 5-39052 U | 5/1993 |
| JP | 2012-54974 A | 3/2012 |
| JP | 2015-504668 A | 2/2015 |
| JP | 7463302 B2 | 4/2024 |
| KR | 10-2014-0114554 A | 9/2014 |
| RU | 2 620 751 C2 | 5/2017 |
| WO | WO 2018/100498 A1 | 6/2018 |
| WO | WO 2018/202730 A1 | 11/2018 |

OTHER PUBLICATIONS

Combined Taiwanese Office Action and Search Report issued Apr. 27, 2023 in Taiwanese Patent Application No. 108124869 (with English Translation), 20 pages.

International Search Report and Written Opinion issued on Mar. 27, 2019 in PCT/CN2018/096246 filed on Jul. 19, 2018.

Korean Office Action issued May 10, 2023 in Korean Patent Application No. 10-2020-7037724, (with English translation), 8 pages.

Extended European Search Report issued Feb. 2, 2022, in corresponding European Patent Application No. 18926422.9, 8 pages.

Japanese Office Action issued on Mar. 15, 2023 in Japanese Patent Application No. 2020-571850 (with English translation), 10 pages.

Office Action issued Dec. 3, 2024, in corresponding Japanese Patent Application No. 2024-006545 (with English Translation), 9 pages.

Korean Notice of Allowance mailed on Feb. 15, 2024 issued in South Korean Patent Application No. 10-2020-7037724 filed on Jul. 19, 2018, with English Translation, total 5 pages.

Combined Chinese Office Action and Search Report issued on Oct. 28, 2023 in Chinese Patent Application No. 201880095049 (with unedited computer-generated English translation), 15 pages.

\* cited by examiner

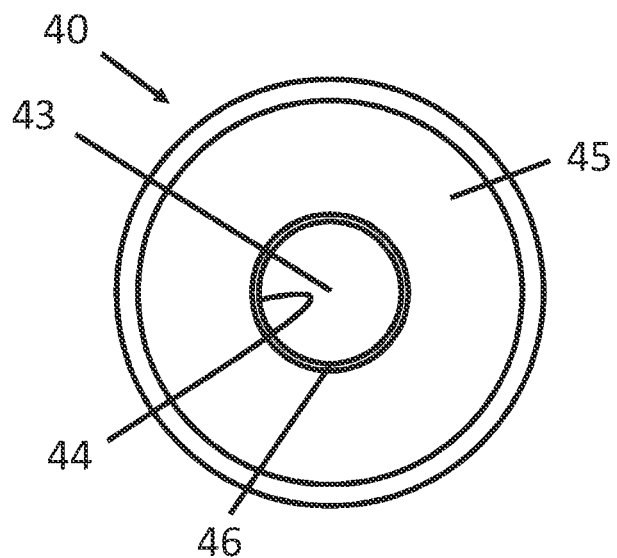 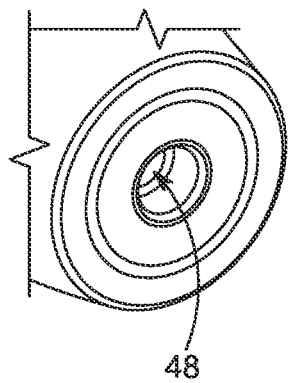
Figure 1        Figure 2
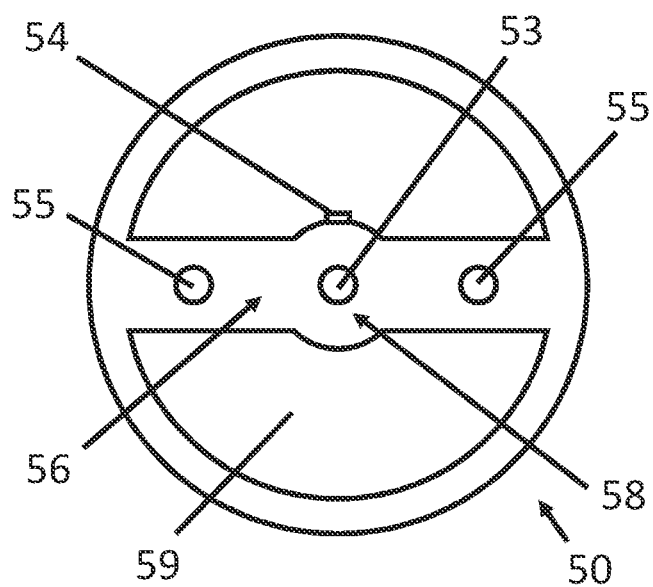 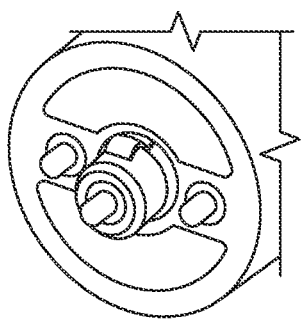
Figure 3        Figure 4

MAGNETIC CONNECTOR

The present invention relates to electrically operated aerosol-generating systems. In particular, the present invention relates to electrically operated aerosol-generating systems comprising an aerosol-generating device and a charging unit. The present invention also relates to electrical connectors for electrically operated aerosol-generating systems.

Electrically operated aerosol-generating systems generally comprise an aerosol-forming substrate and an atomiser, which is operated to atomise the aerosol-forming substrate to form an aerosol for inhalation by a user. Typically, electrically operated aerosol-generating systems also comprise an aerosol-generating device comprising an electrical power supply for supplying power to the atomiser. The atomiser may be an electric heater.

In some systems, the aerosol-generating device is configured to receive an aerosol-generating article comprising a solid aerosol-forming substrate, such as a gathered, crimped sheet of tobacco. In these systems, the device typically comprises the atomiser, which is arranged to heat the aerosol-forming substrate when the article is received in the device. The article may also comprise a filter, which is wrapped together with the aerosol-forming substrate in the form of a rod, similar to a conventional cigarette. In other systems, the device is configured to receive a cartridge comprising the atomiser and a liquid aerosol-forming substrate. Such cartridges are often referred to as cartomisers. Common types of atomiser used in cartomisers comprises a coil of heater wire wound around an elongate wick soaked in liquid aerosol-forming substrate.

Some electrically operated aerosol-generating systems include a charging unit for recharging the electrical power supply of the electrically operated aerosol-generating device. The charging unit may comprise a housing, a rechargeable electrical power supply housed in the housing and a cavity for receiving the electrically operated aerosol-generating device. Typically, charging units are portable and may be carried with the device by a user for extending the operating time of the device.

It would be desirable to improve the speed and ease with which a user is able to electrically connect an aerosol-generating device and a charging unit. It would also be desirable to provide an electrical connector for an electrically operated aerosol-generating system that enables electrical connection between an aerosol-generating device and a charging unit that maintains electrical connection at any orientation of the device and charging unit and during vibrations caused by normal movement of a user. It would further be desirable to provide means to improve the electrical connection between an aerosol-generating device and a charging unit.

According to a first aspect of the present invention there is provided an aerosol-generating system comprising: an aerosol-generating device for receiving an aerosol-forming substrate and generating an aerosol from the aerosol-forming substrate, the aerosol-generating device comprising a rechargeable power source; a charging unit electrically connectable to the aerosol-generating device to supply power to the aerosol-generating device for recharging the rechargeable power source; and an electrical connector. The electrical connector comprises: a first connector part and a second connector part, releasably electrically connectable to the first connector part. The first connector part comprises: a plurality of electrical contacts; and a first magnetic element. The second connector part comprises: a plurality of electrical contacts, wherein at least one of the plurality of electrical contacts is a resilient contact that is actuable between an extended position and a depressed position and is biased to return to the extended position; and a second magnetic element. The aerosol-generating device comprises one of the first and second connector parts and the charging unit comprises the other one of the first and second connector parts. The first and second connector parts are positionable in a first connection position, wherein: the at least one resilient contact of the second connector part is in the extended position; the first connector part is arranged in contact with the at least one resilient contact; the first and second magnetic elements are magnetically attracted to each other, and the force of the magnetic attraction between the first and second s is greater than the force required to move the at least one resilient contact from the extended position to the depressed position.

The at least one resilient contact of the second connector part enables the first and second connector parts to maintain an electrical connection at a range of positions along the length of travel of the at least one resilient contact between the extended and depressed positions. The length of travel of the at least one resilient contact, between the extended position and the depressed position, may be any suitable distance. The length of travel of the at least one resilient contact between the extended position and the depressed position may be at least 0.1 millimetres, at least 0.2 millimetres or at least 0.3 millimetres. The length of travel of the at least one resilient contact between the extended position and the depressed position may be between about 0.1 millimetres and about 1.5 millimetres, between about 0.2 millimetres and about 1 millimetres or between about 0.3 mm and about 0.7 mm.

The at least one resilient contact of the second connector part is biased to return to the extended position. When the at least one resilient contact is depressed from the extended position towards the depressed position by the first connector part, the at least one resilient contact exerts a biasing force on the first part in the direction of the extended position. The first and second magnetic elements are arranged to provide a force of magnetic attraction between the first and second connector parts that acts in the opposite direction to the biasing force of the at least one resilient contact. When the first and second connector parts are in the first connection position, the force of the magnetic attraction between the first and second magnetic elements is greater than the force required to move the at least one resilient contact from the extended position to the depressed position. Advantageously, such a force of magnetic attraction is able to overcome the biasing force of the at least one resilient contact when the first and second connector parts are in the first connection position and draw the first and second connector parts together. In other words, when the first and second connector parts are in the first connection position, the first and second connector parts tend to be drawn towards each other by the magnetic attraction force and the at least one resilient contact of the second connector part is depressed from the extended position towards the depressed position by the first connector part Advantageously, as a user moves the aerosol-generating device and the charging unit into electrical engagement, the force of magnetic attraction between the first and second magnetic elements is such that a user does not experience resistance from the biasing force of the at least one resilient contact as the first and second connector parts engage at the first connection position and as the at least one resilient contact is depressed from the extended position towards the depressed position. In other words, the force of magnetic attraction between the first and second magnetic elements at the first connection position is great enough to hide or mask the biasing force of the at least one resilient contact from a user brining the aerosol-generating device into electrical connection with the charging unit.

When the first and second connector parts are in the first connection position, the force of magnetic attraction between the first and second magnetic elements may be any suitable magnitude. When the first and second connector parts are in the first connection position, the force of magnetic attraction between the first and second magnetic elements may be at least 0.1 Newtons, at least 0.15 Newtons or at least 0.2 Newtons, at least 0.5 Newtons, at least 1 Newton or at least 1.5 Newtons. When the first and second connector parts are in the first connection position, the force of magnetic attraction between the first and second magnetic elements may be at least 0.15 Newtons. When the first and second connector parts are in the first connection position, the force of magnetic attraction between the first and second magnetic elements may be between about 0.1 Newtons and about 10 Newtons, between about 0.5 Newtons and about 5 Newtons or between about 1.5 Newtons and about 4.0 Newtons.

In some preferred embodiments, the first and second connector parts may be further positionable in a second connection position, wherein: at least one of the plurality of electrical contacts of the first connector part is electrically connected to at least one of the plurality of electrical contacts of the second connector part; the first and second magnetic elements are magnetically attracted to each other; and the at least one resilient contact of the second connector is in the depressed position.

When the first and second connector parts are positioned in the second connection position, the at least one resilient contact in the depressed position exerts a biasing force on the first connector part. In some embodiments, when the first and second connector parts are positioned in the second connection position the force of magnetic attraction between the first and second magnetic elements is greater than the biasing force exerted by the at least one resilient contact on the first connector part. Such a force of magnetic attraction ensures that the biasing force of the at least one resilient contact of the second connector part cannot urge the first and second connector parts out of the second connection position.

In some preferred embodiments, when the first and second connector parts are in the second connection position the force of magnetic attraction between the first and second magnetic elements is greater than the weight of the aerosol-generating device. Such a force of magnetic attraction ensures that first and second connector parts may be held in the second connection position regardless of the orientation of the system.

When the first and second connector parts are not electrically engaged, the force of magnetic attraction between the first and second magnetic elements may cause the first and second connector parts to be drawn together into electrical engagement. Advantageously, this provides a degree of self-alignment and self-engagement to the first and second connector parts, facilitating electrical engagement. This may further improve the speed and ease with which a user is able to electrically connect a device and a charging unit. When the first and second connector parts are electrically connected, the force of magnetic attraction between the first and second magnetic elements increases the force required to disengage the first and second connector parts. Advantageously, this substantially inhibits or prevents the first and second connector parts from becoming unintentionally disengaged, for example though vibrations and rotation during transit.

When the first and second connector parts are in the second connection position, the force of magnetic attraction between the first and second magnetic elements may be any suitable magnitude. When the first and second connector parts are in the second connection position, the force of magnetic attraction between the first and second magnetic elements may be at least 0.5 Newtons, at least 1 Newton, at least 1.5 Newtons, at least 2 Newtons, at least 3 Newtons or at least 4 Newtons. When the first and second connector parts are in the second connection position, the force of magnetic attraction between the first and second magnetic elements may be at least 1 Newtons. When the first and second connector parts are in the second connection position the force of magnetic attraction between the first and second magnetic elements may be between about 0.5 Newtons and about 10 Newtons, between about 1 Newton and about 5 Newtons or between about 1.5 Newtons and about 4 Newtons. When the first and second connector parts are in the second connection position the force of magnetic attraction between the first and second magnetic elements may be between about 1.5 Newtons and about 4 Newtons.

In some embodiments, at least one of the first and second magnetic elements may form one or more of the electrical contacts of the first and second connector parts. In some preferred embodiments, one or more of the electrical contacts of the first connector part comprise the first magnetic element. In embodiments where magnetic element does not form one of the electrical contacts, the magnetic element may be electrically isolated from the electrical contacts of the connector part. In some embodiments, at least one of the first and second magnetic elements comprises a permanent magnet. In some preferred embodiments, the second magnetic element of the second connector part comprises a permanent magnet.

As used herein, a 'magnetic element' is used to describe an element that comprises a magnetic material. As used herein, the term 'magnetic material' is used to describe a material which is able to interact with a magnetic field, including both paramagnetic and ferromagnetic materials. A magnetisable material may be a paramagnetic material, such that it only remains magnetised in the presence of an external magnetic field. Alternatively, a magnetisable material may be a material which becomes magnetised in the presence of an external magnetic field and which remains magnetised after the external field is removed (a ferromagnetic material, for example). The term "magnetic material" as used herein encompasses both types of magnetisable material, as well as material which is already magnetised.

At least one of the first and second magnetic elements may comprise an alloy of neodymium, such as neodymium, iron and boron. In other words, at least one of the first and second magnetic elements may be a neodymium magnet. At least one of the first and second magnetic elements may comprise a ferromagnetic stainless steel, such as SS430 stainless steel.

As used herein 'electrical contact' or 'electrical engagement' is used to describe an electrical connection between the first and second connector parts that enables an electric current to flow between the first and second connector parts.

As used herein, the term 'aerosol-generating device' refers to a device that interacts with an aerosol-forming substrate to generate an aerosol that is directly inhalable into a user's lungs thorough the user's mouth. In certain embodiments, an aerosol-generating device may heat an aerosol-forming substrate to facilitate the release of the volatile compounds. An aerosol-generating device may interact with an aerosol-generating article comprising an aerosol-forming substrate or a cartridge comprising an aerosol-forming substrate. An electrically operated aerosol-generating device may comprise an atomiser, such as an electric heater, to heat the aerosol-forming substrate to form an aerosol.

As used herein, the term 'aerosol-generating article' refers to an article comprising an aerosol-forming substrate capable of releasing volatile compounds, which can form an aerosol. In certain embodiments, the aerosol-generating article may comprise an aerosol-forming substrate capable of releasing upon heating volatile compounds, which can form an aerosol.

As used herein, the terms 'upstream', 'downstream', 'proximal' and 'distal' are used to describe the relative positions of components, or portions of components, of aerosol-generating devices, aerosol-generating articles and charging units.

As used herein, the term 'longitudinal' is used to describe the direction between a downstream, proximal or mouth end and the opposed upstream or distal end and the term 'transverse' is used to describe the direction perpendicular to the longitudinal direction.

As used herein, the term 'length' is used to describe the maximum longitudinal dimension between the distal or upstream end and the proximal or downstream end of components, aerosol-generating devices, aerosol-generating articles and charging units.

As used herein, the term 'diameter' is used to describe the maximum transverse dimension of components, aerosol-generating devices, aerosol-generating articles and charging units.

As used herein, the term 'transverse cross-section' is used to describe the cross-section of components, aerosol-generating devices, aerosol-generating articles and charging units in the direction perpendicular to the major axis of the components, aerosol-generating devices, aerosol-generating articles and charging units, respectively.

The first and second magnetic elements may be any suitable shape. For example, the first and second magnetic elements may be substantially circular, elliptical or square. The first and second magnetic elements may be the same shape. The first and second magnetic elements may be different shapes. The first and second magnetic elements may be substantially annular. The first and second magnetic elements may comprise an annular body, ring or tube of magnetic element. Providing an annular body, ring or tube of magnetic element may be advantageous, as the annular body or tube may comprise a central passage through which electrical connectors may pass to connect one or more electrical contacts of the connector part to an electrical power supply of the device or the charging unit.

The first magnetic element may be arranged at any suitable position on the first connector part. The first magnetic element may comprise a body of magnetic element arranged substantially behind the electrical contacts of the first connector part. In other words, one or more of the electrical contacts of the first connector part may overlie the first magnetic element. The first magnetic element may comprise one or more bodies of magnetic element arranged between or around the electrical contacts of the second connector part. In some preferred embodiments, one or more of the electrical contacts of the first connector part may comprise the first magnetic element.

The second magnetic element may be arranged at any suitable position on the second connector part. The second magnetic element may comprise a body of magnetic element arranged substantially behind the electrical contacts of the connector part of the charging unit. In other words, one or more of the electrical contacts of the second connector part may overlie the second magnetic element. One or more of the electrical contacts of the second connector part may comprise the second magnetic element. The second magnetic element may comprise one or more bodies of magnetic element arranged between or around the electrical contacts of the second connector part. In some preferred embodiments, the second magnetic element may comprise two bodies of magnetic element arranged at opposite sides of the electrical contacts of the second connector part, such that the electrical contacts of the second connector part are arranged between the two bodies of magnetic element. The two bodies of magnetic element may be substantially arcuate and may have the same or a similar curvature to the third electrical contact of the first connector part.

The electrical contacts of the first and second connector parts may be any suitable type of electrical contact. The electrical contacts may be pin contacts. Pin contacts may extend or project outwards from a surface, typically substantially perpendicularly to the plane of the surface. The pin contacts may be resilient pin contacts or 'pogo pin' contacts. In other words, the pin contacts may be resilient or spring loaded contacts. At least one of the electrical contacts of the second connector part is a resilient pin contact. The electrical contacts may be plate contacts. Plate contacts may extend substantially on or in a plane or on or along a surface. The electrical contacts may be provided on a printed circuit board. In some embodiments, all of the electrical contacts may be the same type of electrical contact. In other embodiments, the electrical contacts may comprise different types of electrical contact. The electrical contacts of the first connector part may comprise one type of electrical contact and the electrical contacts of the second connector part may comprise a different type of electrical contact.

In some preferred embodiments, the electrical contacts of the first connector part are plate electrical contacts. In other words, typically the electrical contacts of the first connector part extend substantially on or in a plane or on or along a surface of the first connector part. In some preferred embodiments, the first connector part comprises one or more surfaces and each one of the electrical contacts of the first connector part extends substantially on or along one of the one or more surfaces of the first connector part. In some embodiments, the electrical contacts of first connector part may extend substantially on or in the same plane. In some embodiments, the electrical contacts of the first connector part may extend in different planes.

The electrical contacts of the first connector part may be arranged in any suitable arrangement. In some particular embodiments, the first connector part comprises a substantially circular face and a first electrical contact of the first connector part is arranged substantially centrally on the circular face. In some particular embodiments, second and third electrical contacts of the first connector part are arranged around the first connector part. Typically, the second and third electrical contacts of the first connector part are spaced radially outwardly from the first electrical contact. In some embodiments, the second and third electrical contact may be spaced from the first electrical contact by the same distance. In some embodiments, the third electrical contact may be spaced further from the first electrical contact than the second electrical contact.

The plurality of electrical contacts of the first connector part may be circularly symmetrical about an axis of the first connector part. The plurality of electrical contacts of the first connector part and the plurality of electrical contacts of the second connector part may be electrically connectable at any orientation of the first connector part relative to the second connector part about the axis of the first connector part.

A first electrical contact of the first connector part may be substantially circular. In some embodiments, second and third electrical contacts of the first connector part are substantially annular. In other words, each one of the second and third electrical contacts may form a ring which substantially circumscribes the first electrical contact. The second and third electrical contacts of the first connector part may form concentric rings circumscribing the first electrical contact.

In some preferred embodiments, the electrical contacts of the second connector part are pin electrical contacts. In other words, typically the electrical contacts of the second connector part extend outwards from a plane or surface of the second connector part, typically substantially perpendicularly to the plane or surface. The second connector part may comprise one or more surfaces and each electrical contact of the second connector part extends perpendicularly from one of the one or more surfaces of the second connector part.

In some embodiments, all of the electrical contacts of the second electrical connector part are resilient contacts. Resilient contacts may advantageously help to maintain a reliable electrical connection between the first and second connector parts when the first and second connector parts are electrically engaged and are exposed to vibrations and small movements caused by movement of the user.

In some particularly preferred embodiments, the first connector part comprises a face and a recess arranged substantially centrally in the face, the recess having a closed end, an open end at the face and a sidewall extending between the open end and the closed end. A first one of the plurality of electrical contacts may be arranged at the closed end of the recess. A second one of the plurality of electrical contacts may be arranged at the sidewall of the recess and substantially circumscribe the first electrical contact. A third one of the plurality of electrical contacts may be arranged at the face and substantially circumscribe the first electrical contact.

In some particularly preferred embodiments; the second connector part comprises a face and a projection arranged substantially centrally in the face, the projection having an end face and a sidewall extending between the face and the end face of the projection. A first one of the plurality of electrical contacts may be arranged at the end face of the projection. A second one of the plurality of electrical contacts may be arranged at the at least one sidewall of the projection. A third one of the plurality of electrical contacts may be arranged at the face. The third one of the plurality of electrical contacts may be a resilient pin contact. The first one of the plurality of electrical contacts may also be a resilient pin contact. The second one of the plurality of electrical contacts may be a resilient contact. The second connector part may comprise a pair of third electrical contacts arranged at opposite sides of the face. Each of the pair of third electrical contacts may be resilient pin contacts.

In these particularly preferred embodiments, the first and second connector parts may be electrically engaged by inserting the projection of the second connector part into the recess of the first connector part. When the first and second connector parts are electrically engaged:

the first electrical contact of the second connector part, at the end face of the projection, may electrically engage the first electrical contact of the first connector part, at the closed end of the recess;

the second electrical contact of the second connector part, at the sidewall of the projection, may electrically engage the second electrical contact of the first connector part, at the sidewall of the recess; and the third electrical contact of the second connector part, at the substantially planar face, may electrically engage the third electrical contact of the first connector part, at the substantially planar face.

In these particularly preferred embodiments, the recess and the projection of the first and second connector parts may be circularly cylindrical. This may enable the first and second connector parts to be freely rotated relative to each other about the axes of the recess and projection. This may enable the first and second connector parts to be electrically engaged regardless of the angular position of the first connector part relative to the second connector part.

The second electrical contact of the second connector part arranged at the sidewall of the projection may closely fit inside the recess of the first connector part, such as by a friction or interference fit, in order to achieve a reliable electrical engagement with the second electrical contact of the first connector part on the sidewall of the recess. The second electrical contact of the second connector part and the recess may be configured such that the second electrical contact of the second connector part snap fits into the recess when the projection is received in the recess and the first and second connector parts are electrically engaged.

The recess may have any suitable shape and dimensions. The recess may be substantially cylindrical. The recess may have a substantially circular transverse cross-section. The diameter of the recess is less than the diameter of the face. The diameter of the recess may be equal to or less than 75% of the diameter of the face or may be equal to or less than about 50% of the diameter of the face.

The projection may have any suitable shape and dimensions. The projection may be substantially cylindrical. The projection may have a substantially circular transverse cross-section. The diameter of the projection is less than the diameter of the face. The diameter of the projection may be equal to or less than 75% of the diameter of the face or may be equal to or less than about 50% of the diameter of the face.

In some embodiments, the intersection between the end face and the sidewall of the projection may be inclined, bevelled or chamfered to facilitate location of the projection in the recess of the first connector part.

The second connector part may comprise a body on which the electrical contacts are mounted. The projection may be formed integrally with the body or may be a separate part that is secured to a main body portion.

The aerosol-generating device may have a proximal end and a distal end, opposite the proximal end. The proximal end may be the end at which a user draws on the aerosol-generating device to inhale aerosol generated by the device. Accordingly, the proximal end may also be referred to as the mouth end. One of the first and second connector parts may be provided at the distal end of the aerosol-generating device. One of the first and second connector parts may be provided at a distal end face of the aerosol-generating device. The aerosol-generating device may comprise the first or second connector part at a distal end of the device. The aerosol-generating device may comprise the first or second connector part at a distal end face.

The charging unit may comprise a cavity for receiving at least a distal portion of the aerosol-generating device. The charging unit may comprise the first or second connector part at a distal end of the cavity.

The first and second connector parts may be positioned in the second connection position when the distal end of the aerosol-generating device is received at the distal end of cavity of the charging unit.

In some preferred embodiments: the aerosol-generating device comprises the first or second connector part at a distal end of the device; the charging unit comprises a cavity for receiving at least a distal portion of the aerosol-generating device, the other of the first and second connector parts being arranged at a distal end of the cavity; and the first and second connector parts are positionable in the second connection position when the distal end of the aerosol-generating device is received at the distal end of cavity of the charging unit.

In these preferred embodiments, when the first and second contacts are in the first connection position, the force of magnetic attraction between the first and second magnetic elements may be greater than the combination of the force of friction between the aerosol-generating device and the cavity of the charging unit and the biasing force required to actuate the at least one resilient contact between the extended position and the depressed position.

The aerosol-generating device has one of the first connector part and the second connector part and the charging unit has the other one of the first connector part and the second connector part. In some embodiments, the aerosol-generating device may comprise the first connector part and the charging unit may comprise the second connector part. Advantageously, since the electrical contacts of the second connector part comprise at least one resilient contact, providing the second connector on the charging unit may substantially protect the at least one resilient contact from damage.

In embodiments where the device comprises the connector part at the distal end face, the first magnetic element may be arranged proximally of the connector part in the device. In some preferred embodiments where the device comprises the connector part at the distal end face, at least one of the electrical contacts of the first connector part may comprise the first magnetic element.

Where the charging unit comprises a cavity and the connector part of the charging unit is arranged at a closed end of the cavity, the first and second magnetic elements may be arranged such that the magnetic north-south polarity of the magnetic elements is substantially aligned with the longitudinal axis of the cavity. This may enable the magnetic retention means to help draw the aerosol-generating device into the cavity and locate the first and second connector parts in electrical engagement.

In preferred embodiments, one of the first and second magnetic elements comprises a permanent magnet.

In some embodiments, one of the first magnetic elements and the second magnetic elements comprises a plurality of permanent magnets. In some preferred embodiments, the second magnetic element comprises a plurality of permanent magnets.

In some preferred embodiments, one of the first magnetic elements and the second magnetic elements comprises a first permanent magnet and a second permanent magnet. The first and second permanent magnets may be spaced apart in the connector part. In some of these embodiments, the magnetic north-south-polarity of the first permanent magnet may be arranged in the same direction as the magnetic north-south-polarity of the second permanent magnet. In some preferred embodiments, the magnetic north-south-polarity of the first permanent magnet is arranged in the opposite direction to the magnetic north-south-polarity of the second permanent magnet. In these preferred embodiments, a magnetic circuit may be formed when the first connector part and the second connector part are arranged in the first and second connection positions and the first and second permanent magnets are magnetically connected in a magnetic circuit via the magnetic element of the other connector part.

As used herein, a "magnetic circuit" refers to a magnetic connection between two permanent magnets, such that a magnetic field line passes from one magnetic element to another. A magnetic field line may pass from the first permanent magnet to the second permanent magnet via the magnetic element of the other connector part when the first and second connector parts are in the first and second connection positions.

In some particularly preferred embodiments, the second connector part comprises the first and second permanent magnets.

As used herein, references to a "direction" of a magnetic north-south polarity of a magnet is used to refer to the direction of the magnetic field lines produced by the magnet.

As used herein, references to a "magnetic polarity" of a portion of a magnet refers to a magnetic pole, such as a north pole or a south pole of the magnet.

In embodiments in which one of the first and second magnetic elements comprises a plurality of permanent magnets, each permanent magnets may comprise a body extending between two opposing ends. Each end of the body may have a magnetic north-south-polarity. The direction of the magnetic north-south-polarity at a first one of the ends may be arranged in the opposite direction to the magnetic north-south-polarity at the opposite end of the body. The body may have a length extending between the two opposing ends, and the magnetic north-south polarity at each end may be arranged substantially perpendicular to the length of the body. Where the plurality of permanent magnets are provided in the second connector, the direction of the magnetic north-south polarity at each end of each permanent magnet may be substantially parallel to the direction of travel of the resilient contact between the extended position and the depressed position.

Put in another way, the body of each of the plurality of permanent magnets may have an upper side and a lower side, opposite the upper side, the upper and lower sides extending the length of the body between two opposing ends. The upper side at a first one of the ends may have a first magnetic polarity and the lower side at the first one of the ends may have a second magnetic polarity, opposite the first magnetic polarity. The magnetic north-south-polarity at the first one of the ends has a first direction that is perpendicular to the length of the body. The upper side at a second one of the ends, opposite the first end, may have the second polarity, which is the opposite polarity to the upper side at the first one of the ends. The lower side at the second one of the ends may have the first polarity, which is the opposite polarity to the upper side at the second one of the ends. The magnetic north-south-polarity at the second one of the ends has a second direction that is perpendicular to the length of the body and opposite to the first direction.

In some particularly preferred embodiments, the second connector comprises a second magnetic element comprising two permanent magnets. Each permanent magnet has a body extending between two opposing ends. Each permanent magnet has a first end with a magnetic north-south polarity having a first direction and a second end with a magnetic north-south polarity having a second direction, opposite the first direction. The two permanent magnets may be arranged in the second connector part such that each of the permanent magnets experiences a force of magnetic repulsion from the other permanent magnet.

Each of the permanent magnets may have a first end face at the first end and a second end face at the second end. The first end face and the second end face may be arranged substantially parallel to each other. In these embodiments, the first and second magnetic elements may be substantially arcuate. The first and second end faces may lie substantially on a plane.

In some embodiments, two arcuate permanent magnets may be arranged in the second connector part such that: the first end face of the first permanent magnet directly opposes the second end face of the second permanent magnet; and the second end face of the first permanent magnet directly opposes the first end face of the second permanent magnet. Where the first and second permanent magnets are arcuate, the first and second permanent magnets may form a substantially annular magnetic structure. The two permanent magnets may be spaced apart such that a gap is provided between the opposing faces of the permanent magnets. The first and second permanent magnets may substantially circumscribe the electrical contacts of the second connector part.

The first end face of the first permanent magnet may have a magnetic north-south polarity oriented in the same direction as the magnetic north-south-polarity of the second end face of the second permanent magnet. The second end face of the first permanent magnet may have a magnetic north-south polarity oriented in the same direction as the magnetic north-south-polarity of the first end face of the second permanent magnet. In other words, the first end face of the first permanent magnet and the second end face of the second permanent magnet are arranged to magnetically repel each other. Similarly, the second end face of the first permanent magnet and the first end face of the second permanent magnet are arranged to magnetically repel each other.

This arrangement may further increase the force of magnetic attraction between the first magnetic element of the first connector part and the second magnetic element of the second connector part when the first and second connector parts are in the first and second connection positions.

Describing the arrangement in another way, the first end face of the first permanent magnet opposes the second end face of the second permanent magnet and the second end face of the first permanent magnet opposes the first end face of the second permanent magnet. The first end face of the first permanent magnet magnetically repels the second end face of the second permanent magnet and the second end face of the first permanent magnet magnetically repels the first end face of the second permanent magnet. An upper side of the first end face of the first permanent magnet and an upper side of the second end face of the second permanent magnet have the same magnetic polarity. A lower side of the first end face of the first permanent magnet and a lower side of the second end face of the second permanent magnet have the same magnetic polarity, opposite to the magnetic polarity of the upper side of the first end face of the first permanent magnet and the upper side of the second end face of the second permanent magnet. An upper side of the second end face of the first permanent magnet and an upper side of the first end face of the second permanent magnet have the same polarity, opposite to the polarity of the upper side of the first end face of the first magnetic element and the upper side of the second end face of the second magnetic element. A lower side of the second end face of the first permanent magnet and a lower side of the first end face of the second permanent magnet have the same polarity, opposite to the polarity of the upper side of the second end face of the first permanent magnet and the upper side of the first end face of the second permanent magnet.

The first and second permanent magnets may be arranged in a housing of the second connector part. The housing of the second connector part may maintain the separation of the first and second magnetic elements. The housing of the second connector part may prevent the force of magnetic repulsion between the first and second permanent magnets from pushing the permanent magnets apart.

In some alternative embodiments, the first and second permanent magnets may be arranged to magnetically attract.

At least one of the electrical contacts of each of the first and second connector parts may be configured to transfer, convey or supply power from the charging unit to the aerosol-generating device. For example, a first electrical contact of each of the first and second connector parts may be configured to transfer power from the charging unit to the aerosol-generating device. In particular, at least one of the electrical contacts of each of the first and second connector parts may be configured to transfer power from an electrical power supply of the charging unit to a rechargeable electrical power supply of the aerosol-generating device.

At least one of the electrical contacts of each of the first and second connector parts may be configured to transfer data from at least one of the charging unit to the aerosol-generating device and the aerosol-generating device to the charging unit. In some embodiments, at least one of the electrical contacts of each of the first and second connector parts may be configured to transfer data from the charging unit to the aerosol-generating device. For example, a second electrical contact of each of the first and second connector parts may be configured to transfer data from the charging unit to the aerosol-generating device. In some embodiments, at least one of the electrical contacts of each of the first and second connector parts may be configured to transfer data from the aerosol-generating device to the charging unit.

At least one of the electrical contacts of each of the first and second connector parts may also be configured as a ground connection. For example, a third electrical contact of each of the first and second connector parts may be configured as a ground connection.

The first and second connector parts of the present invention may be configured to transfer power from the charging unit to the aerosol-generating device and to transfer data from at least one of the charging unit to the device and the device to the charging unit. Advantageously, this may enable the device to comprise a single electrical connector part only. This may reduce the size and weight of the aerosol-generating device compared to a device having a plurality of electrical connector parts.

Typically, the aerosol-generating device may comprise a rechargeable electrical power supply. The rechargeable electrical power supply may comprise any suitable type of rechargeable electrical power supply, such as batteries or capacitors. The rechargeable electrical power supply may comprise a lithium ion battery. The rechargeable electrical power supply of the aerosol-generating device may have a capacity sufficient for the aerosol-generating device to deliver one or more user experiences. A user experience generally comprises a series of puffs in which a user draws on the aerosol-generating device, the aerosol-generating device generates an aerosol by atomising an aerosol-forming substrate and the user inhales the aerosol generated by the device. The number of puffs constituting a typical user experience may be any suitable number. Typically, the number of puffs may be between two and twenty puffs, may be between four and twelve puffs and may be about six or seven puffs. The rechargeable electrical power supply of the aerosol-generating device may have a capacity sufficient for the aerosol-generating device to deliver any suitable number of user experiences. The rechargeable electrical power supply may have a capacity sufficient for the aerosol-generating device to deliver one, two, three, four, five or six user experiences.

Similarly, the charging unit may comprise an electrical power supply. The electrical power supply of the charging unit may comprise any suitable type of electrical power supply, such as batteries and capacitors. The electrical power supply of the charging unit may comprise a lithium ion battery. The first and second connector parts of the present invention may enable power to be transferred between the electrical power supply of the charging unit and the rechargeable electrical power supply of the aerosol-generating device for charging the rechargeable electrical power supply of the aerosol-generating device. Advantageously, this may extend the useable life of the aerosol-generating device. The electrical power supply of the charging unit may have a capacity sufficient to provide the aerosol-generating device with enough charge to deliver a plurality of user experiences. The electrical power supply of the charging unit may have a capacity sufficient to provide the aerosol-generating device with enough charge to deliver any suitable number of user experiences, such as between one and twenty user experiences, between five and fifteen user experiences and about 10 user experiences. Advantageously, this may enable a user carrying both the aerosol-generating device and the charging unit to use the aerosol-generating device for an extended period of time, such as over a day or a week, without connection of the aerosol-generating device to an external electrical power supply, such as a mains power supply, for charging the rechargeable electrical power supply of the aerosol-generating device.

Typically, the electrical power supply of the charging unit may be rechargeable. The electrical power supply of the charging unit may have a larger capacity than the rechargeable electrical power supply of the aerosol-generating device. The electrical power supply of the charging unit may be physically larger than the rechargeable electrical power supply of the aerosol-generating device.

The aerosol-generating device may be a handheld device. In other words, the aerosol-generating device may have any size and shape suitable to be held in the hand of a user. The aerosol-generating device may have a size and shape similar to a conventional cigarette or cigar. The aerosol-generating device may be portable. Typically, the charging unit may also be portable. The charging unit may have any suitable size and shape. The charging unit may have a size and shape similar to a conventional packet of cigarettes. Providing a portable charging unit may enable a user to carry the charging unit with the aerosol-generating device. Advantageously, this may enable the rechargeable electrical power supply of the aerosol-generating device to be made smaller and more lightweight without sacrificing the operating lifetime of the aerosol-generating device, which is able to be charged from the portable charging unit carried by the user when the rechargeable power supply of the device is depleted.

In some embodiments, at least one of the electrical contacts of each of the first and second connector parts may be configured to transfer data from the charging unit to the aerosol-generating device. This may advantageously enable software updates to be transferred from the charging unit to the aerosol-generating device. In some embodiments, at least one of the other electrical contacts of each of the first and second connector parts may be configured to transfer data from the aerosol-generating device to the charging unit. This may enable usage data to be transferred from the aerosol-generating device to the charging unit. Usage data may include, for example, one or more of state of charge of the rechargeable electrical power supply of the device, number of uses of the device, number of uses of the atomiser and aerosol-forming substrate identification information.

In some embodiments, one or more first electrical contacts of the first and second connector parts may be configured to transfer power between an electrical power supply of the charging unit and a rechargeable electrical power supply of the aerosol-generating device, one or more second electrical connectors of the first and second connector parts may be configured to transfer data from at least one of the charging unit to the aerosol-generating device and the aerosol-generating device to the charging unit and one or more third electrical contacts of the first and second connector parts may be configured as a ground connection.

The electrical contacts may be made from any suitable electrically conductive material. For example, the electrical contacts may be made from a metal such as copper or gold. In some embodiments the electrical contacts are made from the same material and in other embodiments, the electrical contacts are made from different materials.

Typically, the electrical contacts of each of the first and second connector parts are electrically separated or isolated from each other. The electrical separation or isolation of the electrical contacts of each connector part may be provided by an electrically insulating material arranged between adjacent electrical contacts. The electrical separation or isolation may be provided by spacing apart adjacent electrical contacts.

As used herein, 'electrically conductive' refers to material having an electrical resistivity of $1\times10^4$ Ωm, or less. As used herein, 'electrically insulating' refers to material having an electrical resistivity of $1\times10^4$ Ωm or more.

The aerosol-generating device may have any suitable size and shape.

The aerosol-generating device may have a transverse cross-section of any suitable shape. For example, the aerosol-generating device may have a substantially circular, elliptical, triangular, square, rhomboidal, trapezoidal, pentagonal, hexagonal or octagonal transverse cross-section. In some particular embodiments, the aerosol-generating device has a substantially circular transverse cross-section.

The aerosol-generating device may have a substantially constant transverse cross-section along its length. The aerosol-generating device may have a substantially circular transverse cross-section along its length. The device may have rotational symmetry about its longitudinal axis. The device may have rotational symmetry of an order greater than one about its longitudinal axis. The device may be substantially axisymmetric about its longitudinal axis. In particular embodiments, the aerosol-generating device may be substantially circularly cylindrical.

The aerosol-generating device may have any suitable diameter and any suitable length. The aerosol-generating device may be elongate. In some particular embodiments, the aerosol-generating device may have a shape, diameter and length substantially similar to a conventional cigarette or cigar. The aerosol-generating device may have a length between about 30 mm and about 150 mm or between about 50 mm and 120 mm or between about 90 mm and 100 mm. The aerosol-generating device may have an external diameter between about 5 mm and about 30 mm or between about 10 mm and about 20 mm or about 15 mm.

The aerosol-generating device may be configured to receive one or more of a cartridge, an atomiser and an aerosol-generating article. The aerosol-generating device may be configured to receive one or more of a cartridge, an atomiser and an aerosol-generating article at a proximal end. The device may comprise a cavity for receiving one or more of a cartridge, an atomiser and an aerosol-generating article.

In some embodiments, the aerosol-generating device may comprise an atomiser. Where the aerosol-generating device comprises an atomiser, the device may be configured to receive an article comprising an aerosol-forming substrate or a cartridge comprising an aerosol-forming substrate. In other embodiments, the aerosol-generating device may be configured to receive an atomiser or a combination of an atomiser and an article or a cartridge comprising an aerosol-forming substrate. Where the device comprises a cavity for receiving one or more of a cartridge and an aerosol-generating article, the atomizer may be arranged in the cavity.

The device may comprise the one of the first and second connector parts at the distal end of the device. The device may comprise the one of the first and second connector parts at a distal end face of the device. In other words, a face at the distal end of the device, opposite the mouth end, may comprise the one of the first and second connector parts. The distal end face of the device may be substantially circular.

The aerosol-generating device may comprise a housing. In particular embodiments, the housing may be substantially circularly cylindrical. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. In particular embodiments, the material is light and non-brittle.

The rechargeable electrical power supply of the aerosol-generating device may be housed within the housing. The housing may comprise a cavity for receiving one or more of an aerosol-generating article and a cartridge. The aerosol-generating device may comprise an atomiser. The atomiser may be an electric heater. Where the device comprises a cavity for receiving an aerosol-generating article or a cartridge, the atomiser may be arranged in the cavity.

The aerosol-generating device may comprise electrical circuitry. The electric circuitry may be configured to control the transfer of power from the charging unit to the aerosol-generating device when the first and second connector parts are in electrical engagement. The electric circuitry may be configured to control the transfer of data from one or more of the charging unit to the aerosol-generating device and the aerosol-generating device to the charging unit. The electric circuitry may comprise a microprocessor.

The charging unit may have any suitable size and shape. The charging unit may have a transverse cross-section of any suitable shape. For example, the charging unit may have a substantially circular, elliptical, triangular, square, rhomboidal, trapezoidal, pentagonal, hexagonal or octagonal transverse cross-section. In some particular embodiments, the aerosol-generating device has a substantially rectangular transverse cross-section.

The charging unit may have a substantially constant transverse cross-section along its length. The charging unit may have a substantially rectangular transverse cross-section along its length. In particular embodiments, the charging unit may be a substantially rectangular cuboid.

The charging unit may have any suitable diameter and any suitable length. In some embodiments, the aerosol-generating device may have a shape, diameter and length substantially similar to a conventional pack of cigarettes. The charging unit may have a length between about 50 mm and about 200 mm. The charging unit may have an external diameter between about 10 mm and about 150 mm, or between about 50 mm and about 100 mm.

The charging unit may have a cavity configured to receive the aerosol-generating device. The cavity may be configured to receive a distal end of the aerosol-generating device. The cavity may be configured to receive the entire aerosol-generating device. The cavity of the charging unit may have any suitable size and shape for receiving the aerosol-generating device.

The cavity of the charging unit may have a transverse cross-section of any suitable shape. For example, the cavity may have a substantially circular, elliptical, triangular, square, rhomboidal, trapezoidal, pentagonal, hexagonal or octagonal transverse cross-section. In particular embodiments, the cavity of the charging unit may have a transverse cross-section of substantially the same shape as the transverse cross-section of the aerosol-generating device to be received in the cavity. In some particular embodiments, the cavity may have a substantially circular cross-section.

The cavity of the charging unit may have a substantially constant transverse cross-section along its length. The cavity may have a substantially circular transverse cross-section along its length. The cavity may be substantially circularly cylindrical. The cavity may be substantially axisymmetric about its longitudinal axis.

The cavity of the charging unit may have any suitable diameter and any suitable length.

In particular embodiments, the cavity of the charging unit may have a diameter substantially equal to or slightly greater than the diameter of the aerosol-generating device.

The cavity of the charging unit may be elongate. The cavity may have a length that is less than the length of the aerosol-generating device so that when the distal end of the aerosol-generating device is received in the cavity of the charging unit the proximal or downstream end of the aerosol-generating device projects from the cavity. The cavity of the charging unit may have a length that is substantially equal to or slightly greater than the length of the aerosol-generating device such that substantially the entire length of the aerosol-generating device is received in the cavity of the charging unit. Advantageously, this may enable the device to be entirely enclosed within the cavity and may enable the charging unit to protect the device from the external environment.

One of the first and second connector parts may be arranged in the cavity of the charging unit. This arrangement may substantially shield or protect the connector part from the external environment. The cavity may have an open end. The open end may enable the aerosol-generating device to be inserted into the cavity and removed from the cavity. The cavity may also have a closed end, opposite the open end. The one of the first and second connector parts may be arranged at the closed end of the cavity of the charging unit.

In some particular embodiments, one of the first and second connector parts may be arranged at an end face at the distal end of the aerosol-generating device and the other one of the first and second connector parts may be arranged at an end face at the closed end of the cavity of the charging unit. In these particular embodiments, the first and second connector parts may be electrically engaged by inserting the distal end of the aerosol-generating device into the open end of the cavity of the charging unit and bringing the connector part arranged at the distal end face of the device into contact with the connector part arranged at the closed end face of the cavity of the charging unit.

Where the aerosol-generating device and the cavity of the charging unit are substantially circularly cylindrical, the aerosol-generating device may be freely rotated about its longitudinal axis in the cavity. In these embodiments, the first and second connector parts enable the device to be inserted into the cavity at any angular position relative to the cavity of the charging unit and enable the aerosol-generating device to be rotated in the cavity without breaking the electrical connection between the first and second connector parts.

The charging unit may comprise a housing. In particular embodiments, the housing may be a substantially rectangular cuboid. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. In particular embodiments, the material is light and non-brittle.

Where the charging unit comprises a cavity for receiving the aerosol-generating device, the housing may define the cavity. The charging unit may comprise means for closing an open end of the cavity, such as a lid hingedly connected to the housing.

Where the charging unit comprises an electrical power supply, the electrical power supply may be housed in the housing. The charging unit may comprise means for connecting the charging unit to an external electrical power supply, such as a mains power supply, for recharging the electrical power supply of the charging unit.

The charging unit may comprise electrical circuitry. The electric circuitry may be configured to control the transfer of power from the charging unit to the aerosol-generating device when the first and second connector parts are in electrical engagement. The electric circuitry may be configured to control the transfer of data from one or more of the charging unit to the aerosol-generating device and the aerosol-generating device to the charging unit. The electric circuitry may comprise a microprocessor.

It is also envisaged that the first and second connector parts may be used as an electrical connector for electrical systems other than electrically operated aerosol-generating systems. An electrical connector comprising the first and second connector parts may be particularly suitable for systems comprising a portable electrical device and a charging unit, wherein the portable electrical device comprises one of the first and second connector parts and the charging unit comprises the other of the first and second connector parts.

According to a second aspect of the present invention, there is provided an electrical connector comprising the first and second connector parts of the first aspect of the present invention.

In more detail, according to the second aspect of the present invention, there is provided an electrical connector comprising: a first connector part and a second connector part, releasably electrically connectable to the first connector part. The first connector part comprises: a plurality of electrical contacts; and a first magnetic element. The second connector part comprises: a plurality of electrical contacts, wherein at least one of the plurality of electrical contacts is a resilient contact that is actuable between an extended position and a depressed position and is biased to return to the extended position; and a second magnetic element. The first and second connector parts are positionable in a first connection position, wherein: the at least one resilient contact of the second connector part is in the extended position; the first connector part is arranged in contact with the at least one resilient contact; the first and second magnetic elements are magnetically attracted to each other, and the force of the magnetic attraction between the first and second magnetic elements is greater than the force required to move the at least one resilient contact from the extended position to the depressed position.

Any features described above in relation to the first aspect are also applicable to the second aspect.

The invention will be further described, by way of example only, with reference to the accompanying drawings, in which:

FIG. 1 shows a schematic illustration of a first connector part of an electrical connector according to an embodiment of the present invention;

FIG. 2 shows a perspective view of the first connector part of FIG. 1;

FIG. 3 shows a schematic illustration of a second connector part of an electrical connector according to an embodiment of the present invention, the second connector part being compatible with the first connector part of FIG. 1;

FIG. 4 shows a perspective view of the second connector part of FIG. 3;

Figure 5:
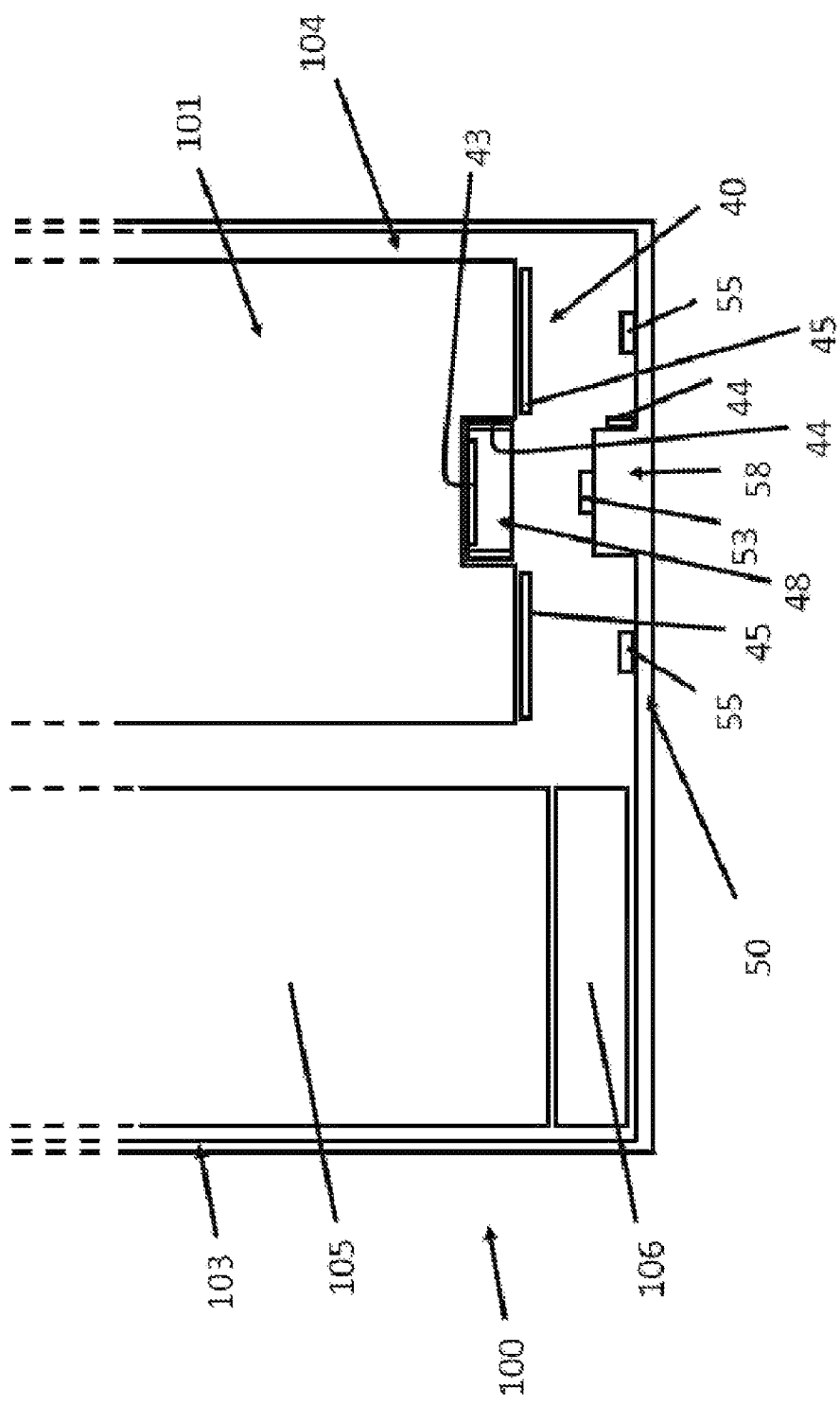
FIG. 5 shows a schematic illustration of an electrically operated aerosol-generating system, the system comprising an aerosol-generating device including the first connector part of FIGS. 1 and 2 received in a charging unit comprising the second connector part of FIGS. 3 and 4.

FIGS. 1 and 2 show schematic illustrations of a first connector part 40 of an electrically operated aerosol-generating system according to an embodiment of the present invention. The first connector part 40 is arranged at a distal end face of an aerosol-generating device (not shown). The first connector part 40 comprises three electrical contacts, a first electrical contact 43, a second electrical contact 44 and a third electrical contact 45.

The first connector part 40 comprises a circular planar face 46 with a recess 48 located at the centre of the face. The recess 48 is circularly cylindrical, having an open end at the face 46, an opposite closed end and a tubular sidewall extending between the open end and the closed end face. The closed end face of the recess is circular and lies on a plane parallel to the plane of the face 46. The circular face 46 has a diameter of about 10 mm and the recess 48 has a diameter of about 4 mm and a depth of about 4 mm.

The first electrical contact 43 is circular and extends substantially over the closed end face of the recess 48. The outer edge of the first electrical contact 43 is defined by the sidewall of the recess 48, and so the diameter of the first electrical contact is the same as the diameter of the recess. The second electrical contact 44 is tubular and extends substantially over the tubular sidewall of the recess 48. The second electrical contact 44 has a thickness of about 0.1 mm, such that positioning the second electrical contact 44 in the recess 48 does not significantly reduce the diameter of the recess 48. The second electrical contact 44 has a width of about 3.8 mm, and is positioned in the recess 48 such that the second electrical contact 44 does not extend to the closed end face of the recess 48. This positioning ensures that the second electrical contact 44 does not contact the first electrical contact 44. The third electrical contact 45 is annular and extends substantially over the face 46. The third electrical 45 contact has an outer diameter of about 8 mm and an inner diameter of about 4.6 mm, such that the third electrical contact 45 does not contact the second electrical contact 44. In this arrangement, the first, second and third electrical contacts 43, 44, 45 are all electrically isolated from each other.

The first and third electrical contacts 43, 45 lie on different, parallel planes and the second electrical contact 44 extends on a cylindrical surface that is perpendicular to the planes of the first and third electrical contacts 43, 45.

In this embodiment, the first electrical contact is formed from a copper alloy, the second electrical contact is formed from SS304 stainless steel and third electrical contact 45 is formed from SS430 stainless steel.

An advantage of the arrangement of electrical contacts 43, 44, 45 of the first connector part 40 is that the electrical contacts have circular rotational symmetry about an axis passing through the centre of the first contact 43 that is perpendicular to the plane of the first electrical contact 43. This enables the first connector part 43 to be connected to a second connector part at any rotational orientation about the axis and present to the second connector part an identical arrangement of contacts. As such, the first connector part 43 may be connected to a second connector part at any orientation of the first connector part 43 relative to the second connector part about the axis of the first connector part 43.

FIGS. 3 and 4 show schematic illustrations of a second connector part 50 of the electrically operated aerosol-generating system according to an embodiment of the present invention. The second connector part 50 is arranged at a closed end face of a cavity of a charging unit (not shown). The second connector part 50 comprises four electrical contacts, a first electrical contact 53, a second electrical contact 54 and two third electrical contacts 55.

The second connector part 50 comprises a circular planar face 56 with a projection 58 located at the centre of the face. The projection 58 extends outwards from the face 56 in a direction perpendicular to the plane of the face 56. The projection 58 is circularly cylindrical and comprises an end face and a tubular sidewall extending between the face 56 and the end face of the projection 58. The end face of the projection 58 is circular and lies on a plane parallel to the plane of the face 56. The projection has substantially the same shape as the recess 48 of the first connector part 40, has a height of about 3 mm and has a maximum diameter slightly smaller than the recess 48 of about 3.3 mm, such that the projection 58 of the second connector part 50 may fit closely within the recess 48 of the first connector part 40. The diameter or width of the projection 58 reduces towards the end face of the projection, such that the interface between the end face and the sidewall of the projection 58 is bevelled to make it easier to locate the projection 58 within the recess 48 of the first connector part 40.

The first electrical contact 53 is a resilient pin contact, or a 'pogo pin' contact arranged on the end face of the projection 58. The first electrical contact 53 extends outwards from the end face of the projection 58, in the same direction as the projection. The second electrical contact 54 is a leaf spring arranged at the sidewall of the projection 58. The second electrical contact 54 extends radially outwards from the sidewall of the projection 58, in a direction perpendicular to the sidewall and parallel with the plane 56, by a maximum distance of about 0.3 mm. The two third electrical contacts 55 are pogo pin contacts similar to the first electrical contact 53. The two third electrical contacts 55 extend outwards from the face 56 in a direction perpendicular to the face 56 and parallel to the first electrical contact 53.

The two third electrical contacts 55 are spaced radially outwardly from the first electrical contact 53 in opposite directions, such that the first electrical contact 53 and the two third electrical contacts 55 are arranged in a line. The two third electrical contacts 55 are spaced from the first electrical contact 53 by equal distances of about 2.75 mm measured from the central axes of the contacts. The distance between the third electrical contacts 54 and the first electrical contact 53 of the second connector part 50 is greater than the diameter of the projection 58.

In this embodiment, the pogo pin contacts 53, 55 are formed from brass and the leaf spring contact 54 is formed from SS301 stainless steel.

The pogo pin contacts 53, 55 typically extend about 1 mm above the face of second connector part 50 from which they extend when they are not compressed, and about 0.5 mm above the face from which they extend when they are fully compressed.

The first and second connector parts 40, 50 comprise magnetic retention means. The magnetic retention means comprises a first magnetic element in the form of the third electrical contact 45 of the first connector part 40, which comprises a ring or band of a ferromagnetic metal. The magnetic retention means further comprises a second magnetic element 59 comprising a pair of arcuate bodies of a ferromagnetic element arranged at opposite sides of the electrical contacts of the second connector part 50. The second magnetic element 59 is electrically isolated from the electrical contacts of the second connector part 50.

In this embodiment, the third electrical contact 45 of the first connector part 40 (i.e. the first magnetic element) is formed from a ferromagnetic stainless steel, such as SS430 stainless steel, and the second magnetic element 59 is formed of an alloy of neodymium, iron and boron that is magnetised to form a permanent magnet.

When the first connector part 40 is moved into the proximity of the first connector part 50, the magnetic attraction between the first and second magnetic elements draws the first and second connector parts together, compressing the pogo pin contacts 53, 55 of the second connector part 50 and brining the electrical contacts of each connector part into electrical engagement. The magnetic retention means helps to retain the first and second connector parts in electrical engagement.

It will be appreciated that in other embodiments, the first magnetic element and second magnetic elements may be formed from alternative materials and may be arranged in different positions. For example, the first magnetic element may be arranged behind the electrical contacts of the first connector part 40, forming a ring of a ferromagnetic material that circumscribes the recess 48, beneath the third electrical contact 45.

It will also be appreciated that in other embodiments, the first magnetic element may comprise a magnetised material and the second magnetic element may comprise an unmagnetised magnetic material. In other embodiments, both the first and second magnetic elements may comprise magnetised magnetic materials.

FIG. 5 shows the first and second connector parts 40, 50 in position in an aerosol-generating system 100 according to the embodiment of the present invention.

The aerosol-generating system 100 comprises an aerosol-generating device 101 having the first connector part 40 arranged at a distal end face. The aerosol-generating system 100 further comprises a charging unit 103 comprising a cavity 104 for receiving the distal end of the aerosol-generating device 101. The cavity 104 comprises the second connector part 50 at a closed end face. The charging unit 103 further comprises a battery 105 and electrical circuitry 106 housed in a housing. The housing defines the circularly cylindrical cavity 104.

The first connector part 40 and the second connector part 50 may be brought into electrical engagement by inserting the distal end of the aerosol-generating device 101 into the cavity 104 of the charging unit 103. The aerosol-generating device 101 is circularly cylindrical and the cavity 104 of the charging unit 103 is also circularly cylindrical, having a diameter that is slightly larger than the diameter of the aerosol-generating device 101. Inserting the distal end of the aerosol-generating device 101 into the cavity 104 aligns the face 46 of the first connector part 40 with the face 56 of the second connector part 50. Aligning the faces 46 and 56 of the first and second connector parts 40, 50 also aligns the recess 48 and the projection 58, the first electrical contacts 43, 53, the second electrical contacts 44, 54 and the third electrical contacts 45, 55 of the first and second connector parts 40, 50, respectively. Accordingly, when the first connector part 40 is brought into contact with the second connector part 50, the projection 58 is received in the recess 48, the first electrical contacts 43, 53 are electrically engaged, the second electrical contacts 44, 54 are electrically engaged and the third electrical contacts 45, 55 are electrically engaged.

Figure 6:
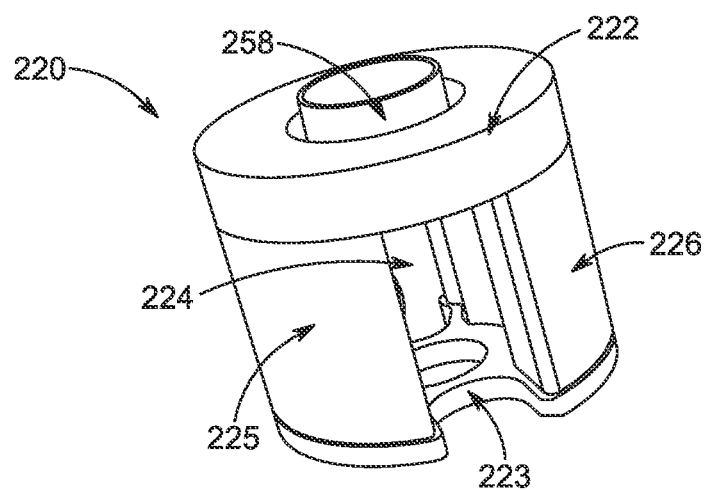
FIG. 6 shows a schematic illustration of a magnetic retention structure compatible with the second connector part of FIGS. 3 and 4.
Figure 7:
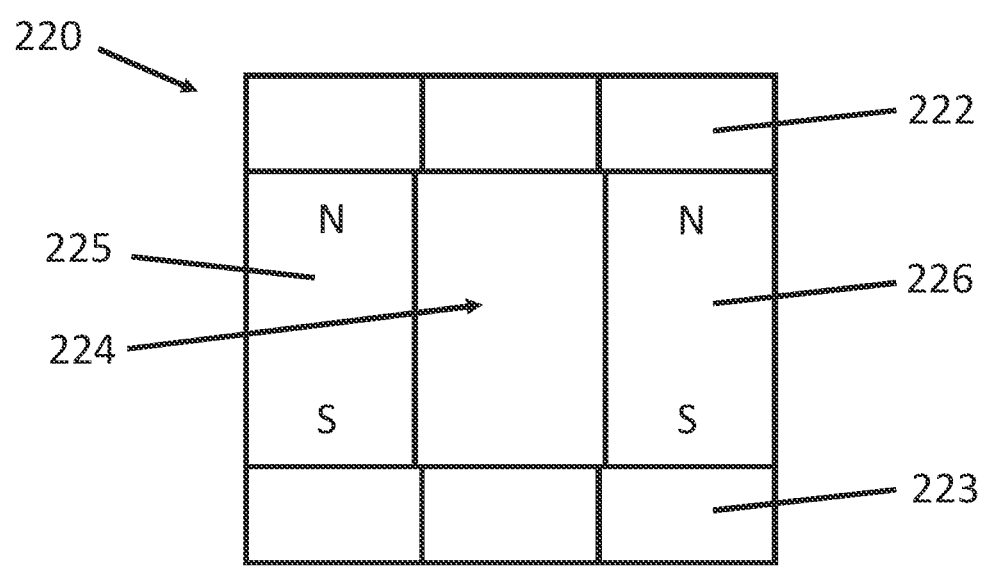
FIG. 7 shows a cross-section of the magnetic retention structure of FIG. 6.
Figure 8:
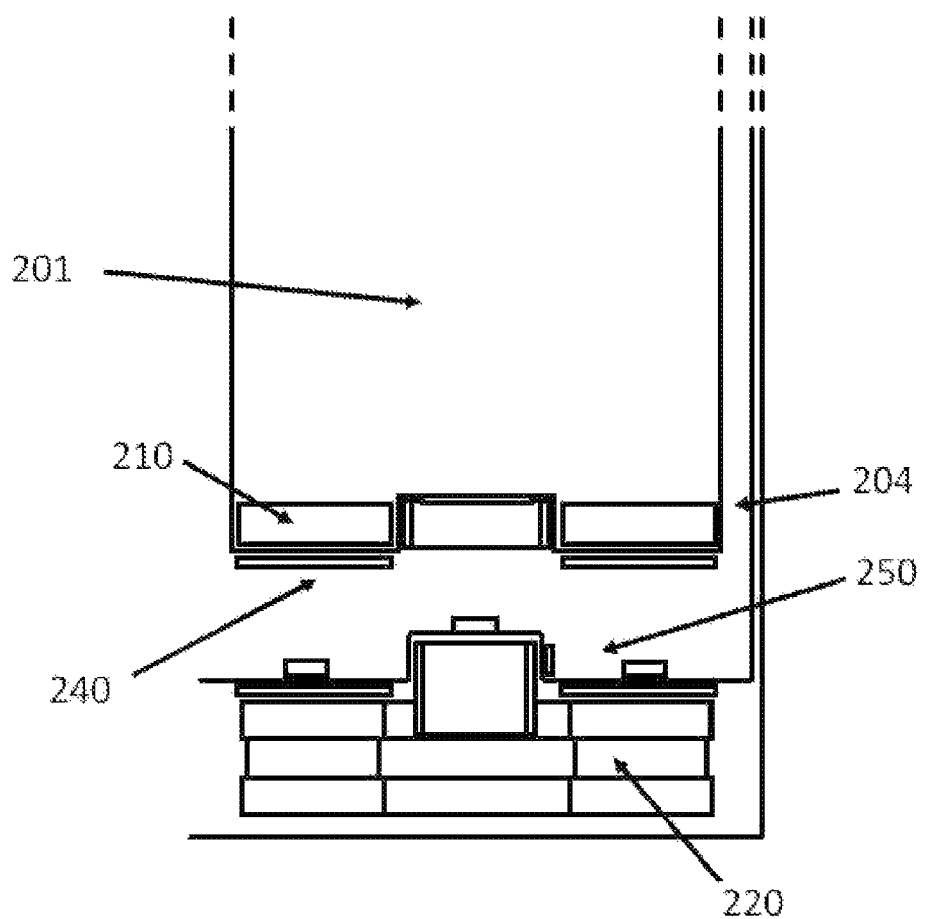
FIG. 8 shows an electrically operated aerosol-generating system comprising the electrical connector according to the embodiment of the present invention and the magnetic retention means of FIGS. 6 and 7.

FIGS. 6, 7 and 8 show an embodiment of magnetic retention means for releasably retaining electrical engagement between first and second connector parts of an aerosol-generating system of the present invention, when an aerosol-generating device 201 of the system is received in a cavity 204 of a charging unit of the system. The magnetic retention means comprises a first magnetic element 210 at the distal end of the aerosol-generating device 201 and a second magnetic element at a closed end of the cavity 204.

The aerosol-generating device 201 comprises a first connector part 240 at a distal end face. In this embodiment, the first magnetic element 210 does not form the third electrical contact of the first connector part 240. The first magnetic element 210 comprises a ring of ferromagnetic material arranged proximally of the first connector part 250 in the device 201. The ring circumscribes the recess 258 of the first connector part 250 and is electrically isolated from the first connector part 240.

The cavity 204 of the charging unit comprises a second connector part 250 at a closed end face. The second magnetic element 220 comprises a tubular magnetic structure, shown in detail in FIGS. 6 and 7. The second magnetic element 220 is arranged beneath the second connector part 250 and is electrically isolated from the second connector part 250.

FIGS. 6 and 7 show schematic illustrations of the second magnetic element 220. The second magnetic element 220 generally comprises two rings 222, 223 of ferromagnetic material that are aligned such that an unobstructed cylindrical passage 204 is provided through the rings 222, 223. The rings 222, 223 are spaced apart along the axis of the cylindrical passage, and separated by two permanent magnets 225, 226.

The two permanent magnets 225, 226 are identical to each other. Each one of the permanent magnets comprises a semi-circular arc having a radius equal to the radius of the rings 222, 223. The permanent magnets 225, 226 are arranged to generally circumscribe the cylindrical passage 224, on opposite sides of the central passage. The magnetic north-south polarities of the permanent magnets 225, 226 are oriented in the same direction, as illustrated in FIG. 7 by the letters 'N' and 'S'.

Each magnet 225, 226 has opposing ends and a body extending between the opposing ends. The body of each magnet 225, 226 has an arcuate upper side and an opposing arcuate lower side extending between the ends. Each magnet 225, 226 has a single magnetic north pole at one of the upper and lower sides and a single magnetic south pole at the opposite one of the upper and lower sides. In this embodiment, the magnetic north poles of the magnets 225, 226 are arranged at the upper sides of the magnets, adjacent to the top ring 222, and the magnetic south poles of the magnets 225, 226 are arranged at the lower sides, adjacent to the bottom ring 223. In this arrangement, the second magnetic element 220 forms a generally tubular permanent magnet.

The second magnetic element 220 is arranged in the charging unit below the second connector part 250 at the closed end of the cavity 204. The central passage 223 through the second magnetic element 220 is aligned with the projection 258 of the second connector part 250, and enables electrical connectors to connect the first and second electrical contacts of the second connector part 250, which are arranged on the projection 258, to the electrical circuitry of the charging unit.

The magnetic north-south polarity of the second magnetic element 220 is generally aligned with the longitudinal axis of the cavity 204. When the first connector part 240 is moved into the cavity and into close proximity to the second connector part 250, the second magnetic element 220 magnetises the first magnetic element 210 in the aerosol-generating device, and the magnetic attraction between the first magnetic element 210 and the second magnetic element 220 draws the aerosol-generating device along the longitudinal axis of the cavity 204 towards the second connector part 250 and the second magnetic element 220 at the closed end. This action facilitates electrical connection of the first and second connector parts 240, 250.

When the first and second connector parts 240, 250 are electrically engaged, the magnetic attraction between the first and second magnetic elements 210, 220 releasably retains the first and second connector parts 240, 250 together, in electrical engagement. In other words, the magnetic attraction between the first and second magnetic elements resists separation of the first and second connector parts 240, 250 in the direction of the longitudinal axis of the cavity 204. As such, additional force is required to disengage the first and second connector parts 240, 250.

Figure 9:
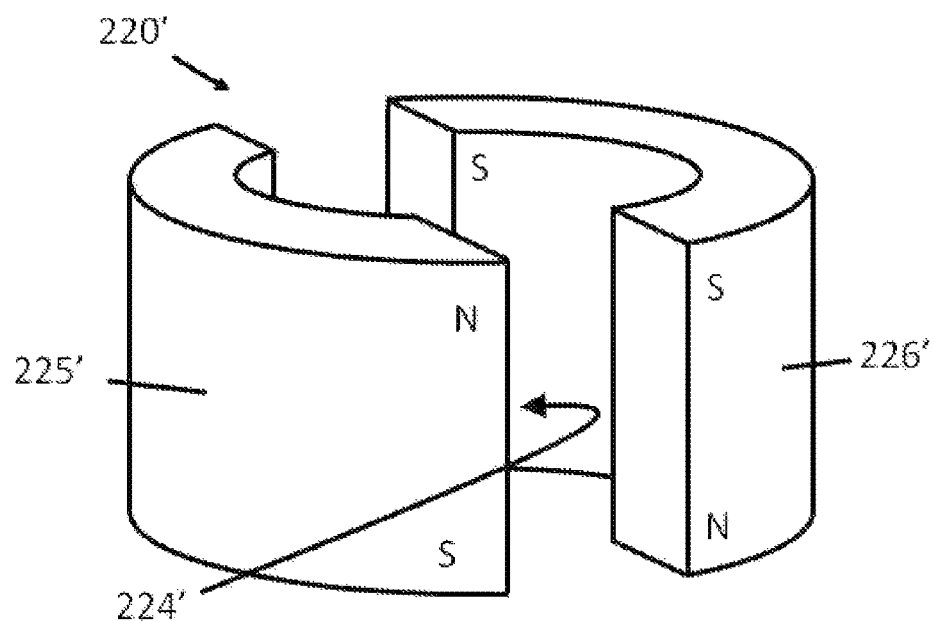
FIG. 9 shows a perspective view of another embodiment of a magnetic retention structure compatible with the second connector part of FIGS. 3 and 4.
Figure 10:
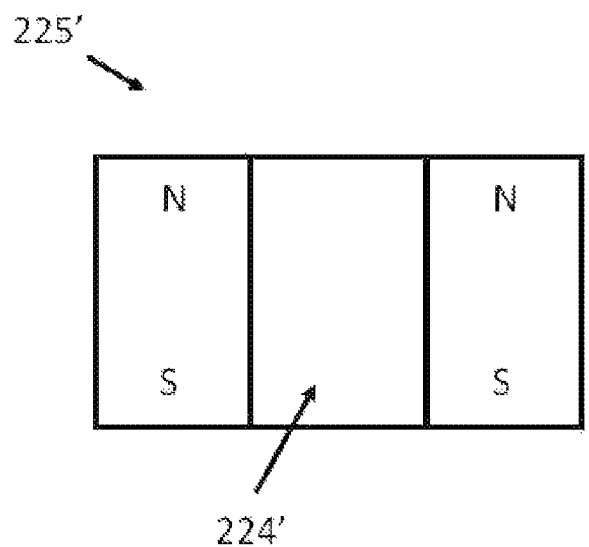
FIG. 10 shows a front view of one of the magnets of the arrangement of FIG. 9.
Figure 11:
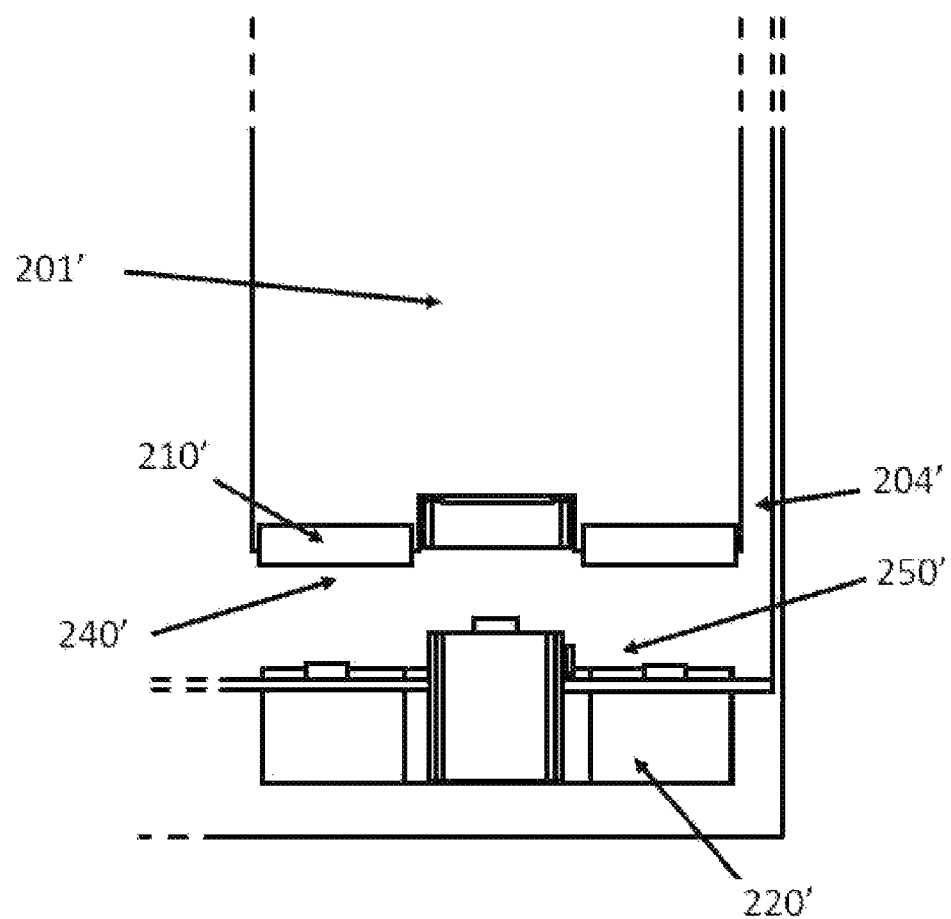
FIG. 11 shows an electrically operated aerosol-generating system comprising the electrical connector according to the embodiment of the present invention and the magnetic retention means of FIGS. 9 and 10.

FIGS. 9, 10 and 11 show another embodiment of magnetic retention means for releasably retaining electrical engagement between first and second connector parts 240', 250' of an aerosol-generating system of the present invention, when an aerosol-generating device 201' of the system is received in a cavity 204' of a charging unit of the system. The magnetic retention means comprises a first magnetic element 210' at the distal end of the aerosol-generating device 201' and a second magnetic element 220' at a closed end of the cavity 204'.

The aerosol-generating device 201' comprises a first connector part 240' at a distal end face. In this embodiment, the third electrical contact of the first connector part 240' comprises the first magnetic element 210', and as such, the first magnetic element 210' comprises a ring of ferromagnetic material which circumscribes the recess of the first connector part 240'.

The cavity 204' of the charging unit comprises a second connector part 250' at a closed end face of the cavity. The second magnetic element 220' comprises two arcuate permanent magnets 225', 226', shown in FIGS. 9 and 10. The two permanent magnets 225', 226' are arcuate and have the same curvature as the third electrical contact of the first connector part 210'. The permanent magnets 225' and 226' are arranged on opposite sides of the second connector part 250' and are electrically isolated from the second connector part 250'. The permanent magnets 225', 226' are arranged to curve laterally around the cylindrical passage 224' and generally circumscribe the cylindrical passage 224', on opposite sides. The permanent magnets 225', 226'; are also spaced apart laterally such that the magnets 225' 226' are arranged on opposite sides of the third electrical contacts of the second connector part 250', with the third electrical contacts disposed between them.

As shown in FIG. 11, the permanent magnets 225', 226' extend above the surface of the second connector part 250'. An arcuate upper surface of the permanent magnets 225', 226' is arranged to a position just below the top of the third electrical contacts pogo pins, when the pogo pin contacts are in their compressed position. In this arrangement, the first magnetic element 210' of the device 201' is arranged adjacent to the second magnetic element 220' of the cavity 204' of the charging unit, when the device 201' is arranged in the cavity 204' and the first connector part 240' is in contact with the second connector part 250'.

Each magnet 225', 226' has a single magnetic north pole at one of the upper and lower sides and a single magnetic south pole at the opposite one of the upper and lower sides. As shown in FIG. 10 for magnet 225', when each magnet is viewed from the front, looking at the opposing end faces of the arcuate magnet, both end faces of the magnet have a magnetic north-south polarity oriented in the same direction.

The magnetic north-south polarities of the permanent magnets 225', 226' are oriented in opposite directions, as illustrated in FIG. 10 by the letters 'N' and 'S'. The magnetic north pole of the magnet 225' and the magnetic south pole of the magnet 226' are arranged to extend out from the surface of the second connector part 250', in the direction of the central passage through the magnets. In this arrangement, the magnetic north pole of the magnet 225' and the magnetic south pole of the magnet 226' are arranged adjacent to the first magnetic element 210' when the device 201' is arranged in the cavity 204' and the first and second connector parts 240', 250' are engaged. In this arrangement, the permanent magnet 225', the first magnetic element 210' and the permanent magnet 226' form a magnetic circuit.

The magnetic attraction between the first magnetic element 210' and the second magnetic element 220' draws the aerosol-generating device along the longitudinal axis of the cavity 204' towards the second connector part 250' and the second magnetic element 220' at the closed end. This action facilitates electrical connection of the first and second connector parts 240', 250', as described for the previous embodiment.

Figure 12:
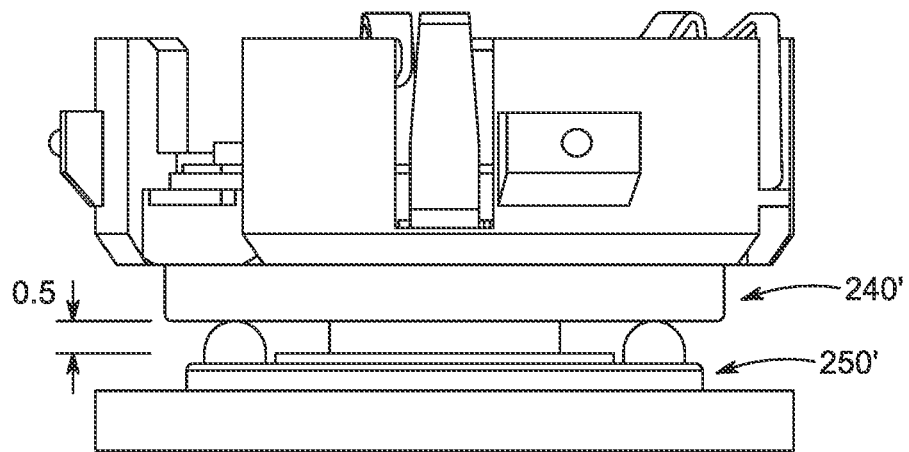
FIG. 12 shows a side view of the electrical connector of FIG. 11 in a first connection position.

FIG. 12 shows the first connector part 240' and the second connector part 250' in a first connection position. In the first connection position, the first and second connector parts 240', 250' are in electrical engagement. In other words, in the first connection position the first electrical contacts of the connector part are engaged, the second electrical contacts of the connector parts are engaged and the third electrical contacts of the connector parts are engaged. In the first connection position, the first resilient pin contacts (not shown) and the third resilient pin contacts of the second connector part are in their extended position. In the first connection position, the force of the magnetic attraction from between the first magnetic element 210' and the second magnetic element 220' is greater than the force required to depress the first and second resilient pin contacts of the second connector part and the force of friction between the device and the charging unit. As such, the first and second connector parts 240', 250' are drawn together by the force of magnetic attraction. A user moving the device into the cavity of the charging unit, through the first connection position, would not experience additional resistance at the first connection position, when the first connector part abuts the resilient pin contacts, as the force of magnetic attraction between the first and second magnetic elements 210', 220' effectively masks the biasing force exerted on the device by the resilient pin contacts. In this embodiment, the first magnetic element and the second magnetic element 210', 220' are separated by about 0.5 millimetres when the first and second connector parts 240', 250' are in the first connection position.

Figure 13:
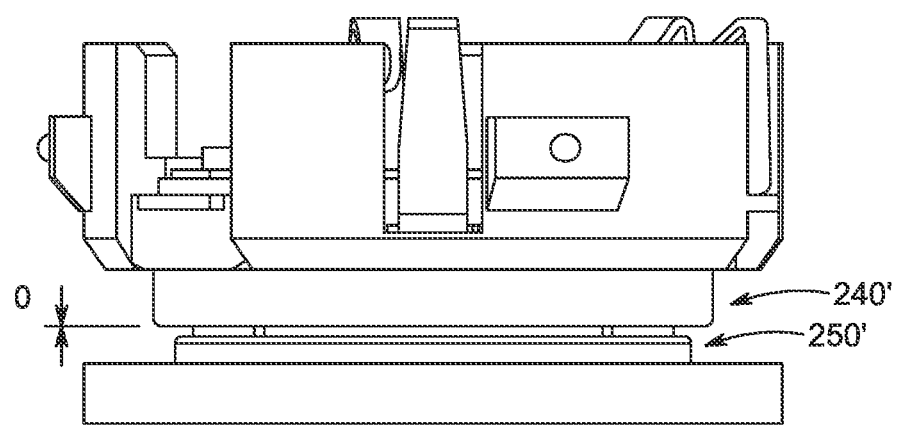
FIG. 13 shows a side view of the electrical connector of FIG. 11 in a second connection position.

FIG. 13 shows the first connector part 240' and the second connector part 250' in a second connection position. In the second connection position, the first and second connector parts 240', 250' are also in electrical engagement. In the second connection position, the first resilient pin contacts (not shown) and the third resilient pin contacts of the second connector part are in their depressed position. In the second connection position, the force of the magnetic attraction between the first magnetic element 210' and the second magnetic element 220' is greater than the combination of the biasing force exerted on the first connector part 240' by the resilient pin contacts of the second connector part 250' and the weight of the aerosol-generating device, such that the charging unit and device may be turned upside down and the aerosol-generating device would be held in the second connection position by the force of magnetic attraction. In this embodiment, a small gap is provided between the first and second magnetic elements in the second connection position. It will be appreciated that in other embodiments, the first and second magnetic elements may be in direct contact in the second connection position.

Figure 14:
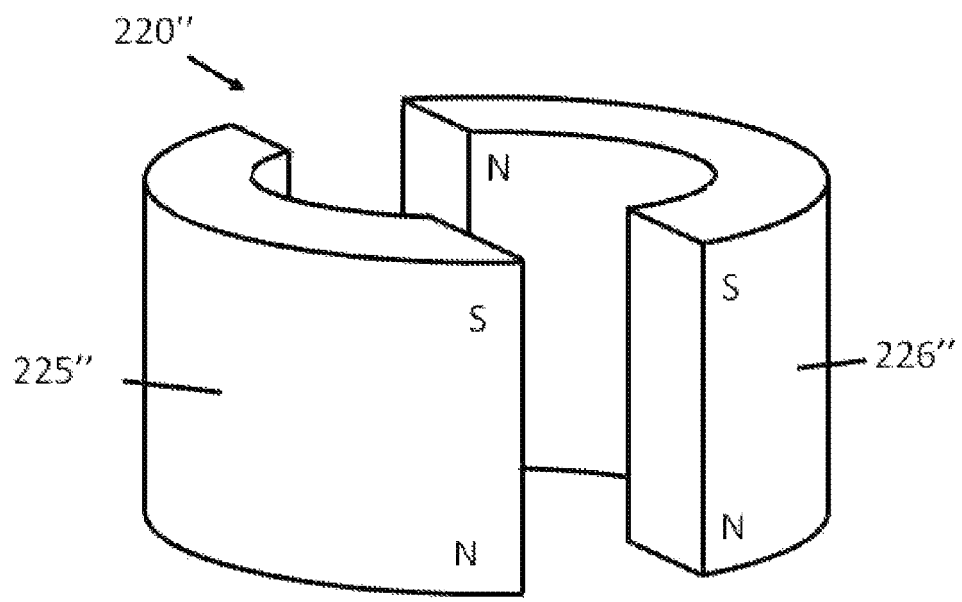
FIG. 14 shows a perspective view of another embodiment of a magnetic retention structure compatible with the second connector part of FIGS. 3 and 4.
Figure 15:
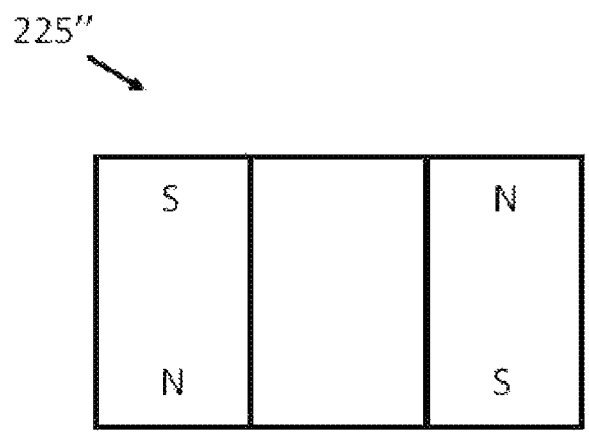
FIG. 15 shows a front view of one of the magnets of the arrangement of FIG. 12.

FIGS. 14 and 15 show an alternative embodiment for the second magnetic element of the magnetic retention means of FIGS. 9, 10 and 11 described above. The second magnetic element 220" of the embodiment shown in FIGS. 14 and 15 comprises two arcuate permanent magnets 225", 226", which are identical to the permanent magnets 225', 226' of FIGS. 9 and 10. The permanent magnets 225", 226" differ from the magnets 225', 226' in the arrangement of the magnetic north-south polarities.

Each one of the upper and lower sides of each of the magnets 225", 226" has a magnetic north pole and a magnetic south pole. For each magnet 225", 226" the magnetic north pole of upper side is arranged at the opposite end to the magnetic north pole of the lower side. Similarly, the magnetic south pole of the upper side is arranged at the opposite end to the magnetic south pole of the lower side. Put in another way, each end face of each of the magnets 225", 226" has a magnetic north-south-polarity in an opposite direction. As shown in FIG. 14 for magnet 225", in this arrangement, when viewing each magnet from the front and looking at both end surfaces of the arcuate magnet, the end surfaces have magnetic north-south polarities oriented in opposite directions. In other words, the magnetic north poles are arranged at diagonally opposite corners of the magnet and the magnetic south poles are arranged at diagonally opposite corners of the magnet.

The permanent magnets 225", 226" are arranged around the second connector part (not shown) in a similar manner to the magnets 225', 226' described above for the embodiment shown in FIG. 11. When the magnets 225", 226" are arranged around the second connector part, the magnetic north poles of the magnet 225" are arranged adjacent to the magnetic north poles of the second magnet 226" and the magnetic south poles of the magnet 225" are arranged adjacent to the magnetic south poles of the magnet 226", as shown in FIG. 12. In this arrangement, when the first magnetic element is arranged adjacent to the arcuate upper surfaces of the magnets 225", 226", the magnets 225", 226" and the first magnetic element form an alternative magnetic circuit to the circuit describe above in relation to the embodiment of FIGS. 9, 10 and 11.

It will be appreciated that in other embodiments, the permanent magnets of the second magnetic element may have a magnetic north-south polarity oriented in the opposite direction. It will be appreciated that in embodiments comprising a second magnetic element comprising more than one permanent magnet, the magnetic north-south polarities of the magnets may be oriented in alternative arrangements. It will also be appreciated that in other embodiments the first magnetic element of the aerosol-generating device may comprise one or more permanent magnets.

It will be appreciated that features described in relation to one embodiment or aspect of the present invention may be applied to other embodiments or aspects of the present invention.

The invention claimed is:

1. An aerosol-generating system, comprising:
an aerosol-generating device configured to receive an aerosol-forming substrate and to generate an aerosol from the aerosol-forming substrate, the aerosol-generating device comprising a rechargeable power source;
a charging unit electrically connectable to the aerosol-generating device and being configured to supply power to the aerosol-generating device to recharge the rechargeable power source; and
an electrical connector comprising:
a first connector part comprising:
a plurality of electrical contacts, and
a first magnetic element, and
a second connector part, releasably electrically connectable to the first connector part, the second connector part comprising:
a plurality of electrical contacts, wherein at least one of the plurality of electrical contacts is a resilient contact that is actuable between an extended position and a depressed position and is biased to return to the extended position, and
a second magnetic element,
wherein:
the aerosol-generating device comprises one of the first and the second connector parts and the charging unit comprises the other one of the first and the second connector parts, and
the first and the second connector parts are positionable in a first connection position,
wherein:
the at least one resilient contact of the second connector part is in the extended position,
the first connector part is arranged in contact with the at least one resilient contact,
the first and the second magnetic elements are magnetically attracted to each other, and
a force of the magnetic attraction between the first and the second magnetic elements is greater than a force required to move the at least one resilient contact from the extended position to the depressed position,
wherein the first and the second connector parts are further positionable in a second connection position,
wherein:
at least one of the plurality of electrical contacts of the first connector part is electrically connected to at least one of the plurality of electrical contacts of the second connector part,
the first and the second magnetic elements are magnetically attracted to each other, and
the at least one resilient contact of the second connector is in the depressed position, and
wherein when the first and the second connector parts are in the second connection position a force of magnetic attraction between the first and the second magnetic elements is greater than a weight of the aerosol-generating device, and
wherein:
the aerosol-generating device further comprises the first or the second connector part at a distal end of the device,
the charging unit further comprises a cavity configured to receive at least a distal portion of the aerosol-generating device, the other of the first and the second connector parts being arranged at a distal end of the cavity, and
the first and the second connector parts are positionable in the second connection position when the distal end of the aerosol-generating device is received at the distal end of cavity of the charging unit.

2. The aerosol-generating system according to claim 1, wherein the force of magnetic attraction between the first and the second magnetic elements is at least 0.15 Newtons when the first and the second connector parts are in the first connection position.

3. The aerosol-generating system according to claim 1, wherein the force of magnetic attraction between the first and the second magnetic elements is between about 0.2

Newtons and about 10 Newtons when the first and the second connector parts are in the first connection position.

4. The aerosol-generating system according to claim 1, wherein a length of travel of the at least one resilient contact between the extended position and the depressed position is between about 0.3 mm and about 0.7 mm.

5. The aerosol-generating system according to claim 1, wherein when the first and the second connector parts are positioned in the second connection position:
the at least one resilient contact in the depressed position exerts a biasing force on the first connector part, and
a force of magnetic attraction between the first and the second magnetic elements is greater than a biasing force exerted by the at least one resilient contact on the first connector part.

6. The aerosol-generating system according to claim 1, wherein the force of magnetic attraction between the first and the second magnetic elements is at least 1 Newtons when the first and the second connector parts are in the second connection position.

7. The aerosol-generating system according to claim 1, wherein the force of magnetic attraction between the first and the second magnetic elements is between about 1.5 Newtons and about 4 Newtons when the first and the second connector parts are in the second connection position.

8. The aerosol-generating system according to claim 1, wherein at least one of the plurality of electrical contacts of the first connector part is formed from the first magnetic element.

9. The aerosol-generating system according to claim 1, wherein the first magnetic element comprises a permanent magnet.

10. The aerosol-generating system according to claim 1, wherein:
the first connector part comprises:
a face of the first connector part and a recess arranged substantially centrally in the face of the first connector part, the recess having a closed end, an open end at the face of the first connector part, and a sidewall extending between the open end and the closed end,
a first one of the plurality of electrical contacts of the first connector part arranged at the closed end of the recess,
a second one of the plurality of electrical contacts of the first connector part arranged at the sidewall of the recess and substantially circumscribing the first one of the plurality of electrical contacts of the first connector part, and
a third one of the plurality of electrical contacts of the first connector part arranged at the face of the first connector part and substantially circumscribing the first one of the plurality of electrical contacts of the first connector part, and
the second connector part comprises:
a face of the second connector part and a projection arranged substantially centrally in the face of the second connector part, the projection having an end face and a sidewall extending between the face of the second connector part and the end face of the projection,
a first one of the plurality of electrical contacts of the second connector part arranged at the end face of the projection,
a second one of the plurality of electrical contacts of the second connector part arranged at the at least one sidewall of the projection, and
a third one of the plurality of electrical contacts of the second connector part arranged at the face of the second connector part, the third one of the plurality of electrical contacts of the second connector part being a resilient pin contact.

11. The aerosol-generating system according to claim 1, wherein the force of magnetic attraction between the first and the second magnetic elements when the first and the second connector parts are in the first connection position is greater than a combination of a force of friction between the aerosol-generating device and the cavity of the charging unit and a biasing force required to actuate the at least one resilient contact between the extended position and the depressed position.

12. The aerosol-generating system according to claim 1, wherein the aerosol-generating device further comprises the first connector part and the charging unit comprises the second connector part.

13. The aerosol-generating system according to claim 1, wherein:
one of the first and the second magnetic elements comprises a first permanent magnet and a second permanent magnet, spaced apart from the first permanent magnet, and
a magnetic north-south-polarity of the first permanent magnet is arranged in an opposite direction to a magnetic north-south-polarity of the second permanent magnet.

14. The aerosol-generating system according to claim 1, wherein:
the second magnetic element of the second connector part comprises two permanent magnets, each permanent magnet having:
a body extending between two opposing ends,
a first end with a magnetic north-south polarity having a first direction, and
a second end with a magnetic north-south polarity having a second direction, opposite the first direction, and
the two permanent magnets are arranged in the second connector part such that each of the permanent magnets experiences a force of magnetic repulsion from the other permanent magnet.

15. The aerosol-generating system according to claim 1, wherein the plurality of electrical contacts of the first connector part are circularly symmetrical about an axis of the first connector part and the plurality of electrical contacts of the first connector part, and
wherein the plurality of electrical contacts of the second connector part are electrically connectable at any orientation of the first connector part relative to the second connector part about the axis of the first connector part.

16. The aerosol-generating system according to claim 1, wherein the first and second magnetic elements are arranged such that a magnetic north-south polarity of the magnetic elements is substantially aligned with a longitudinal axis of the cavity.

* * * * *